United States Patent

[11] 3,617,091

| [72] | Inventors | William D. Mooney |
|---|---|---|
| | | Warminster; |
| | | Albert S. Polis, Philadelphia, both of Pa. |
| [21] | Appl. No. | 40,529 |
| [22] | Filed | May 26, 1970 |
| [45] | Patented | Nov. 2, 1971 |
| [73] | Assignee | Cardinal Engineering Corporation |
| | | Conshohocken, Pa. |

[54] SAW CONTROL SYSTEM
18 Claims, 1 Drawing Fig.

| [52] | U.S. Cl. | 299/39, 173/24, 180/53 CD |
|---|---|---|
| [51] | Int. Cl. | E01c 23/09 |
| [50] | Field of Search | 299/24, 39, 40, 41; 172/114; 173/24; 180/53 CD |

[56] References Cited
UNITED STATES PATENTS

| 3,141,702 | 7/1964 | Barton | 299/39 |
|---|---|---|---|
| 3,475,056 | 10/1969 | Jones | 299/24 |

*Primary Examiner*—Ernest R. Purser
*Attorney*—McClure & Millman

ABSTRACT: A self-propelled saw machine having a vertically adjustable rotary blade for cutting or grooving concrete or similarly durable flooring or paving material is provided with hydraulic control of the blade height and of the rate of machine travel, both forward and reverse, including a creep speed when the blade is in lowered cutting position and a faster over-the-road speed when the blade is in raised noncutting position.

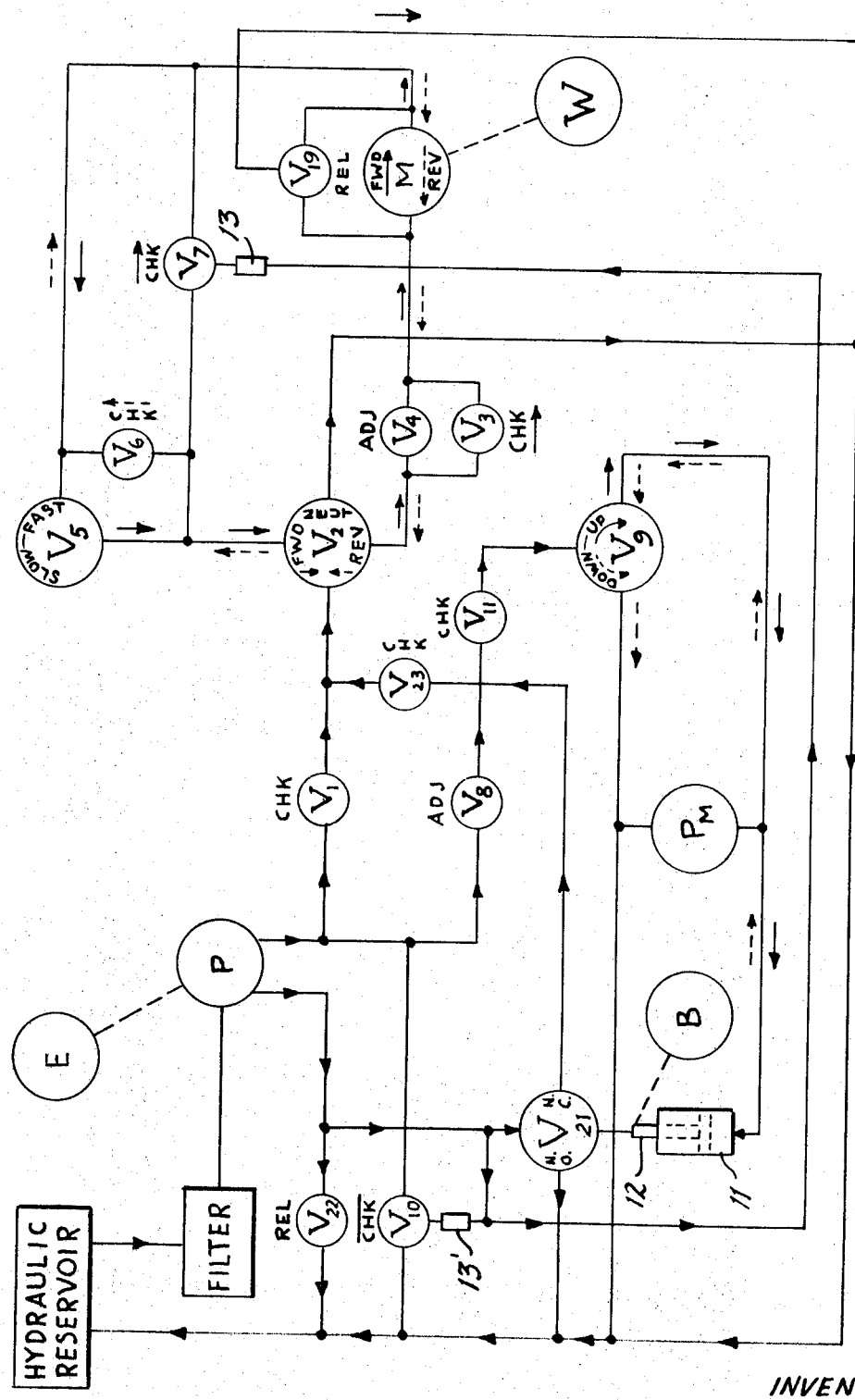

SAW CONTROL SYSTEM

This invention relates to fluid control of a self-propelled saw for flooring or pavement, especially concrete or like durable material.

Mechanical transmission of motive power in a self-propelled saw has drawbacks of relative inflexibility if simple in construction and excessive cost and weight if sufficient complex to provide desirable flexibility in travel speed and adjustment of blade height.

A primary object of the present invention is provision of dissimilar speed ranges for a pavement saw in accordance with blade position, i.e., whether in cutting or noncutting location.

Another object is hydraulic control of height or vertical adjustment of a rotary cutting blade, primarily powered but also with manual backup.

A further object is simplification in manual control of travel speed and direction and also blade height in such a saw.

Other objects of the present invention, together with means and methods for attaining the various objects, will be apparent from the following description and the accompanying illustration of a preferred embodiment of the invention.

The FIGURE is a schematic representation of the interconnection, both fluid and mechanical, of the various apparatus components of the invention.

The illustrated control system is useful with the saw machine of U.S. Pat. No. 3,301,601, for example, the contents of which are incorporated herein by this reference thereto. Accordingly, when apparatus components such as the cutting blade, engine, frame, or wheels are mentioned, it will be understood that those components of that prior patent provide, together with their functionally related components, an instance of the applicability of this invention. It will be understood, moreover, that the present invention is applicable also to other similar saw machinery and is not limited to use with that disclosed in the mentioned patent.

In general, the objects of the present invention are accomplished, in a self-propelling saw machine, by means of fluid interconnection of an engine or similar motive means of a saw machine to supporting wheels thereof to drive them. More particularly, the invention provides an hydraulic control system adapted to furnish two ranges of travel speed and comprising a reservoir of hydraulic fluid, pump means driven by the motive means, with fluid interconnection from the reservoir, and having a first fluid output and a second fluid output; a fluid motor with fluid interconnection to the pump to be driven by fluid pumped thereby, the fluid motor being interconnected mechanically to at least some of the supporting wheels to drive the same and thereby propel the machine; and valve means operative to supply the first fluid output to the fluid motor when the rotary blade is in a lowered cutting position and operative to supply the second fluid output to the fluid motor when the rotary blade is in a raised noncutting position. Further features are described specifically below.

The FIGURE indicates mechanical interconnection in broken lines and fluid interconnection in solid lines, with superimposed arrows indicating normal directions of flow. Thus, engine E supported on the frame (not shown) of the saw machine is connected mechanically by any suitable drive linkage to hydraulic pump means P The pump means has extensive fluid interconnection to fluid motor M, which is connected mechanically to wheels W to drive the machine in its travel over the ground or over flooring or paving to be cut or grooved by cutting blade B. The blade itself is connected mechanically to a piston of hydraulic lift mechanism (also shown schematically) to be raised and lowered thereby. Pump means P preferably comprises a single-input pump with dual outputs but may be made up of two separate pumps mechanically linked together. It is supplied by gravity feed with oil or other hydraulic fluid from the indicated Hydraulic Reservoir through the indicated Filter, both mounted on the frame (not shown) of the saw machine.

The outputs of pump means P enter a maze of interconnecting fluid lines, and for convenience in reference the output indicated at the right is referred to herein as the first output and the lines through which it flows as the first fluid network, while the output indicated at the left is denoted as the second output and the lines through which it flows as the second fluid network, it being realized that because of the interconnection of various lines the respective networks are more readily so identifiable at and near the pump means than remote therefrom, where certain of the lines are adapted to receive either output.

The respective outputs of the pump means are preferably distinguished from one another as follows: the first output is characterized by relatively high pressure and low volume, while the second output is characterized by relatively high volume and low pressure. As will become apparent from the further description below, the first output is employed to propel the saw machine at a relatively slow travel or creep speed when the cutting blade is in a lowered cutting position, and the second output is employed to propel it at a faster or over-the-road rate when the cutting blade is in a raised noncutting position.

The first fluid network comprises check valve $V_1$ through which part of the first output fluid flows to tridirectional valve $V_2$, which has the following three positions: forward (FWD with solid arrow), neutral (NEUT), and reverse (REV with broken arrow). When valve $V_2$ is in the forward position the fluid received thereby from pump means P flows, as indicated by the solid arrows, therefrom through check valve $V_3$ (thereby bypassing adjustable valve $V_4$ in parallel therewith) to fluid motor M, which rotates accordingly in a direction to drive the wheels in the forward direction and cause the machine to travel in the forward direction. From the motor the fluid normally flows through adjustable speed-control valve $V_5$ (being precluded by check valve $V_6$ in parallel therewith from bypassing the speed-control valve) and back to directional valve $V_2$. From this directional valve the fluid returns directly to the hydraulic reservoir through a return line coupled to the valve neutral output connection.

The neutral output from tridirectional valve $V_2$ is not connected to the valve input in either the forward or reverse position but only when the valve arm (not shown) is set to the neutral position. In such neutral position only, such output and input are bridged by a relief valve (not shown) built into valve $V_2$ and set for a pressure sufficient to operate hydraulic lift means for the cutting blade, as discussed further hereinafter. Of course, in the neutral position there is no fluid supply to the motor, whereupon the saw machine is no longer self-propelling until the valve is switched to either the forward or the reverse position.

In the reverse position the fluid received from the pump means by tridirectional valve $V_2$ follows a slightly different path, as indicated by the arrows shown in broken or dashed lines. It bypasses speed control valve $V_5$ by way of parallel check valve $V_6$ to fluid motor M, from which it returns to valve $V_2$ (and, thus, to the reservoir return line) by way of adjustable valve $V_4$, not being able to pass through parallel check valve $V_3$ as is indicated by the contrary arrow. Valve $V_4$ is preset to limit the speed of travel (in reverse) to a desirably low value. The fluid motor has double-acting or crossover relief valve $V_{19}$ flanking it, set for a higher pressure in the forward direction than in the reverse direction. This valve connects the fluid motor directly to the reservoir return line.

The first network of output fluid from pump means P has a branch line to the right located below the portions just described in the FIGURE leading through adjustable valve $V_8$ and check valve $V_{11}$ to bidirectional valve $V_9$, which functions to control the height of vertically adjustable cutter blade B. In the left or DOWN position of the valve, the input fluid is exhausted directly to the reservoir return line, while in the right or UP position the fluid is passed to hydraulic lift means 11 under relatively high pressure (in the neutral position of valve $V_2$), such pressure being retained by check valve $V_{11}$ despite subsequent switching of valve $V_2$ to either the forward or reverse direction. Such input of hydraulic fluid to the lift means is effective to raise the piston thereof, together with cutting blade B, which is connected mechanically to piston rod 12. Manual pump $P_M$ is connected between the return line from valve $V_9$ and the lift means, thereby providing in effect a parallel source of fluid pressure when engine-driven pump means P is inoperative, whether because the engine is not running or otherwise, so as to enable the operator to raise the cutting blade out of engagement with the underlying flooring or pavement.

The first network also has a branch at the left containing check valve $V_{10}$ and leading directly to the reservoir return line, but in which normally there is no flow because of the contrary direction of the check valve. Like check valve $V_7$ in the alternative return line from fluid motor M, check valve $V_{10}$ has associated therewith one of a pair of hydraulic actuators 13, 13' connected by pilot lines to second fluid output of pump means P ahead of bidirectional valve $V_{21}$. Also connected to the second output ahead of valve $V_{21}$ is relief valve $V_{22}$, which vents to the reservoir relief line any excessive fluid pressure that may build up in the low-pressure fluid network when bidirectional valve $V_{21}$, which is normally open (N.O.) directly to the reservoir return line, is actuated to direct the fluid output through its normally closed (N.C.) connection to the first network.

Actuation of bidirectional valve $V_{21}$ is by means of mechanical connection to piston rod 12 of hydraulic lift means 11, from which it will be apparent that the normally closed connection of this valve is opened only when cutting blade B is in raised nonoperating position. The interconnection to the first network is through a line containing check valve $V_{23}$ to the input connection of tridirectional valve $V_2$. When bidirectional valve $V_{21}$ is so actuated the load resistance to flow of the second fluid output from the second network into the first network (and, thus, to fluid motor M) provides enough back pressure through the pilot lines to open check valves $V_7$ and $V_{10}$ through their respective hydraulic actuators 13, 13'. Valve $V_{10}$ vents the first output of the pump means to the reservoir return line, and valve $V_7$ opens the bypass output line from the fluid motor to the reservoir return line through the tridirectional valve.

Accordingly, when the cutting blade is in a lowered operating position the saw machine travels in a direction determined by the setting of tridirectional valve $V_2$ and at a speed determined either by speed control valve $V_5$ (forward) or by adjustable valve $V_4$ (reverse). When the cutting blade is in a raised nonoperating position the speed is greater by reason of the fact that a greater volume of fluid is being supplied to the fluid motor. In the preferred embodiment just described, the pump means provides such high-volume output, which is then substituted for the low-volume output thereof. Such substitution is more advantageous than adding a second pump output to the first to increase the fluid volume to the motor and, thus, the speed of travel of the saw machine not only because it is more efficient but also because its lower heat load eliminates need for an oil (or other hydraulic fluid) cooler in the system and because a relatively small fluid reservoir can be used.

In practice, speed control valve $V_5$, tridirectional valve $V_2$, and height control valve $V_9$ (all shown in a single column and larger than the other valves) are mounted conveniently on a control panel (not shown) readily available to the machine operator both visually and manually. The handle (not shown) of manually actuated pump $P_m$ also may be mounted on such control panel for convenient access. The other apparatus components are supported by the frame (not shown) at available locations adjacent thereto in accordance with the networks of fluid lines and related mechanical interconnections as are illustrated in the drawing and are outlined above. Physical placement of the components and construction of suitable mechanical connections where indicated are well within the abilities of persons having ordinary skill in the art, in the light of the foregoing, so further description or illustration thereof herein is superfluous and would lengthen this specification unnecessarily.

Certain advantages and benefits of this invention have been mentioned above, and others will become apparent to those who undertake to practice it. Certain modifications have been suggested also, and others may be made, as by adding, combining, or subdividing parts or steps, while retaining at least some of those advantages and benefits. The invention itself is defined in the following claims.

The claimed invention is:

1. In a saw machine having motive means, a vertically adjustable rotary blade driven by the motive means for cutting or grooving concrete or similarly durable flooring or paving material, and wheels for supporting itself thereon; the improvement comprising an hydraulic control system comprising a reservoir of hydraulic fluid, pump means driven by the motive means, with fluid interconnection from the reservoir, and having a first fluid output and a second fluid output; a fluid motor with fluid interconnection to the pump to be driven by fluid pumped thereby, the fluid motor being interconnected mechanically to at least some of the supporting wheels to drive the same and thereby propel the machine; and valve means operative to supply the first fluid output to the fluid motor when the rotary blade is in a lowered cutting position and operative to supply the second fluid output to the fluid motor when the rotary blade is in a raised noncutting position.

2. The saw machine of claim 1, wherein the fluid motor is reversible and including valve means for reversing the flow of fluid from the pump means through the motor.

3. The saw machine of claim 1, wherein the first fluid output provided by the pump means is characterized by high pressure and low volume, and the second fluid output provided by the pump means is characterized by low pressure and high volume.

4. The saw machine of claim 1, including adjustable valve means interposed as speed control means in the path of fluid flow between the pump means and the fluid motor.

5. The saw machine of claim 1, including valve means, actuated by means raised when the rotary blade is raised to substitute the second fluid output for the first fluid output from the pump means to the fluid motor.

6. The saw machine of claim 1, including hydraulic lift means with fluid interconnection to the pump means and valve means interposed in the path of fluid therebetween to control supply of fluid to the lift means to raise the rotary blade from a lowered cutting position to a raised noncutting position and to lower it to such cutting position.

7. The saw machine of claim 6, wherein the fluid interconnection of the hydraulic lift means is to the first fluid output of the pump means.

8. The saw machine of claim 7, including a manual pump connected in parallel with the pump means between the hydraulic lift means and a return fluid interconnection to the reservoir.

9. A self-propelling saw machine having motive means, a vertically adjustable rotary blade driven by the motive means for cutting or grooving concrete or similarly durable flooring or paving material, and wheels for supporting itself therein, and an hydraulic control system; comprising a reservoir of hydraulic fluid having a return line thereto, pump means driven by the motive means, with fluid interconnection from the reservoir, and a fluid motor interconnected mechanically to at least some of the supporting wheels to drive the same; a first fluid output network and a second fluid output network interconnected to transmit fluid from the pump means to the fluid motor to drive the same, the fluid motor also having output fluid interconnection to the reservoir return line; the first network comprising a first directional valve and forward and reverse directional lines connected thereto for alternate directional interconnection thereby to the pump means, each such directional line including an adjustable valve to control the rate of flow of fluid therethrough and thereby control the speed of rotation of the motor and of travel of the saw machine; the second network comprising a second directional valve, actuated in accordance with the position of the rotary blade, normally open to the reservoir return line when the blade is in a lowered cutting position but closed off from the return line when the blade is in a raised noncutting position and then open to and interconnected with the fluid motor.

10. The saw machine of claim 9, wherein the directional valve in the first network has a neutral position in which the pump means is connected to neither of such branch lines but is connected thereby through an output connection to the reservoir return line.

11. The saw machine of claim 10, wherein the fluid motor has output interconnection to the reservoir return line, whenever either of the directional lines is connected to receive output from the pump means, through the other directional line to the neutral output connection of the directional valve.

12. The saw machine of claim 11, including in each directional line of the first network a check valve bypassing the adjustable valve therein in the direction of flow opposite to the driving direction therethrough.

13. The saw machine of claim 11, including a crossover relief valve flanking the connections to the fluid motor and interconnected to the reservoir return line.

14. The saw machine of claim 9, including a valve actuated by fluid back pressure located ahead of the directional valve of the second network and effective, when that directional valve is actuated to direct fluid from the pump means to the fluid motor instead of to the reservoir return line, to divert fluid in the first network to the reservoir return line instead of the fluid motor, the output of the pump means to the first network being characterized by high pressure and low volume, and the output of the pump means to the second network being characterized by high volume and low pressure.

15. The saw machine of claim 14, including another valve actuated by back pressure ahead of the directional valve of the second network and effective, when that directional valve is actuated to direct fluid from the pump means to the fluid motor instead of to the reservoir return line, to divert output flow of fluid reaching the fluid motor through either of the forward and return directional lines directly to the directional valve of the first network and thus to the reservoir return line through neutral output connection of the latter directional valve, thereby bypassing the other directional line.

16. The saw machine of claim 9, wherein the first network includes a branch line independent of the first directional valve and including hydraulic lift means mechanically connected to the rotary blade to control the vertical position thereof and including a third directional valve to control flow of fluid to the hydraulic lift means to actuate it.

17. The saw mechanism of claim 16, wherein the hydraulic lift means includes a piston mechanically interconnected to raise the rotary blade when fluid is supplied to the hydraulic lift means via the third directional valve, the valve otherwise connecting the branch line to the reservoir return line.

18. The saw mechanism of claim 17, wherein the branch line contains a manual pump connected in parallel with the pump means to provide fluid to the hydraulic lift means and thereby raise the rotary blade when the pump means is not operating.

* * * * *